(12) United States Patent
Eklöf et al.

(10) Patent No.: US 10,165,616 B2
(45) Date of Patent: Dec. 25, 2018

(54) MCI TRANSMISSION FOR MAC HANDSHAKE

(71) Applicant: TELEFONAKTIEBOLAGET LM ERICSSON (PUBL), Stockholm (SE)

(72) Inventors: Cecilia Eklöf, Täby (SE); Waikwok Kwong, Solna (SE); Nianshan Shi, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/555,831

(22) PCT Filed: Sep. 21, 2016

(86) PCT No.: PCT/IB2016/055644
§ 371 (c)(1),
(2) Date: Sep. 5, 2017

(87) PCT Pub. No.: WO2017/051333
PCT Pub. Date: Mar. 30, 2017

(65) Prior Publication Data
US 2018/0049266 A1    Feb. 15, 2018

Related U.S. Application Data

(60) Provisional application No. 62/233,068, filed on Sep. 25, 2015.

(51) Int. Cl.
*H04W 72/04* (2009.01)
*H04W 76/20* (2018.01)
(Continued)

(52) U.S. Cl.
CPC ............. *H04W 76/20* (2018.02); *H04L 1/189* (2013.01); *H04L 1/1864* (2013.01);
(Continued)

(58) Field of Classification Search
CPC ............................. H04W 76/20; H04W 76/27
See application file for complete search history.

(56) References Cited

U.S. PATENT DOCUMENTS

| 2010/0135220 A1* | 6/2010 | Bergstrom | ............ H04W 28/18 370/329 |
|---|---|---|---|
| 2012/0020247 A1* | 1/2012 | Chun | .................... H04L 1/0002 370/254 |

(Continued)

FOREIGN PATENT DOCUMENTS

| WO | 2009/038356 A2 | 3/2009 |
|---|---|---|
| WO | 2013/066102 A1 | 5/2013 |

(Continued)

*Primary Examiner* — Joshua Kading
*Assistant Examiner* — Lalita W Pace

(57) ABSTRACT

According to some embodiments, a method in a wireless device of reconfiguring radio resources comprises: receiving a radio resource control (RRC) message; obtaining a maximum retransmission threshold value and an indication of a backup reconfiguration time; sending a control information message; determining the wireless device has not received a hybrid automatic repeat request (HARQ) acknowledgment (ACK) in response to the control information message; determining a number of control information message transmissions is less than the maximum retransmission threshold value; sending another control information message; determining the wireless device has not received a HARQ ACK in response to the control information message; and performing radio resource reconfiguration at the backup reconfiguration time. The method may further comprise obtaining a time threshold value and determining a current time is not within the time threshold value of the backup reconfiguration time before sending a control information message.

14 Claims, 11 Drawing Sheets

(51) Int. Cl.
*H04L 1/18* (2006.01)
*H04W 24/02* (2009.01)
*H04W 28/04* (2009.01)
*H04W 80/02* (2009.01)

(52) U.S. Cl.
CPC ........... *H04L 1/1896* (2013.01); *H04W 24/02* (2013.01); *H04W 28/04* (2013.01); *H04W 80/02* (2013.01)

(56) References Cited

U.S. PATENT DOCUMENTS

| | | | |
|---|---|---|---|
| 2014/0241149 A1* | 8/2014 | Liu | H04W 8/22 370/228 |
| 2014/0274083 A1* | 9/2014 | Sheik | H04L 1/1858 455/450 |
| 2016/0150494 A1* | 5/2016 | Tabet | H04W 56/0005 370/350 |
| 2016/0337088 A1* | 11/2016 | Quan | H04L 1/1812 |
| 2018/0069665 A1* | 3/2018 | Lee | H04L 1/1864 |

FOREIGN PATENT DOCUMENTS

| | | |
|---|---|---|
| WO | 2014/133848 A2 | 9/2014 |
| WO | 2016/080894 A1 | 5/2016 |

\* cited by examiner

MCI TRANSMISSION FOR MAC HANDSHAKE

RELATED APPLICATION

This application claims benefit under 35 U.S.C. § 119(e) to U.S. Provisional Application Ser. No. 62/233,068, entitled "MCI TRANSMISSION FOR MAC HANDSHAKE," filed Sep. 25, 2015, the entire content of which is incorporated herein by reference.

TECHNICAL FIELD

Particular embodiments are directed to wireless communications and, more particularly, to Media Access Control (MAC) Control Information (MCI) transmission in MAC layer handshake procedures.

BACKGROUND

In a Third Generation Partnership Project (3GPP) wireless network, the radio resource control (RRC) protocol establishes, maintains, and releases the RRC connection between a user equipment (UE) and the universal mobile telecommunications system (UMTS) terrestrial radio access network (UTRAN). The RRC protocol also establishes, reconfigures, and releases Radio Bearers (RBs) and Signaling Radio Bearers (SRBs).

Various RRC procedures (e.g., RB Setup, RB Release, and RB Reconfigure) may reconfigure the radio access bearer (RAB), RB/SRB, transport channel, and/or physical channel parameters in the UE from a first or source configuration to a second or target configuration. The reconfiguration is typically triggered by data activity/inactivity of existing radio bearers or setup/release of new radio bearers.

For some reconfigurations, the UE and the network change configuration at the same time to avoid a misalignment between which configurations the UE and the network are using. A misalignment of configurations may result in the UE and the network being unable to communicate. Such reconfigurations use synchronized RRC procedures. An example of a conventional synchronized RRC procedure is illustrated in FIG. 1.

FIG. 1 is a signaling diagram illustrating an example method of a conventional synchronized RRC procedure. In general, the network calculates an activation time and sends the activation time to the UE. The network includes margins in the calculation to account for various types of delays.

At step 52, radio network controller (RNC) 40 receives a trigger for a reconfiguration. RNC 40 sends reconfiguration messages to UE 10 and radio base station (RBS) 20 containing the new configuration at step 54. The messages include an activation time, specifying the connection frame number (CFN) when UE 10 and RBS 20 should switch to the new configuration. RNC 40 calculates when UE 10 could be ready to switch to the new configuration and sets the CFN accordingly.

To minimize the risk of a dropped call because of a state misalignment between UE 10 and RBS 20, RNC 40 allows for sufficient time for the UE to receive the reconfiguration message and prepare to switch configurations at the specified CFN. Thus, RNC 40 may typically estimate the activation CFN conservatively to account for UEs 10 that may be in poor radio conditions, to account for large possible fluctuations in transport network delay, etc. The result is a long activation time in which all reconfigurations suffer from a long delay that is only needed in a small percentage of reconfigurations.

Enhancements to synchronized RRC procedures may include media access control (MAC) layer handshake procedures. Such procedures may be performed without a high speed signaling channel (HS-SCCH) order. An enhancement may include exchanging a backup CFN at which time the switch should occur if the handshake fails. For example, a MAC layer handshake may send an offset and a backup CFN in a downlink RRC reconfiguration message. When the UE is ready to switch to the new configuration, the UE sends an uplink MAC Control Information (MCI). At the hybrid automatic repeat request (HARQ) acknowledgement (ACK) to the MCI, both the UE and the network calculate the activation time by adding the offset to the current CFN. An advantage is that this approach does not add margins for air interface delays. An example is illustrated in FIG. 2.

FIG. 2 is a signaling diagram illustrating an example method of a conventional synchronized RRC procedure using a MAC layer handshake. In general, UE 10 sends an MCI when UE 10 is ready to switch to the new configuration. UE 10 and the network then calculate the activation time based on the time for the HARQ ACK to the MCI and the offset sent in the RRC message. This enhancement enables a faster switch to the new configuration. If the handshake fails for some reason, then UE 10 and the network will switch to the new configuration at the backup activation time.

If the MCI or its HARQ ACK is lost over the air, then UE 10 retransmits the MCI according to the conventional HARQ mechanism. The activation time is not determined until the HARQ ACK to the MCI is successfully received. If UE 10 has not received the ACK to the MCI after a maximum number of retransmissions, then UE 10 will fall back to the backup CFN. Similarly, if RBS 20 has not received an MCI for the reconfiguration, RBS 20 will switch to the new configuration at the backup CFN.

A problem with the MAC level handshake is that if the NodeB has received the MCI but the downlink HARQ ACK does not reach the UE, then the UE and the network may be misaligned with respect to the switch CFN. For example, the network will calculate a switch CFN based on the MCI ACK and the offset, but the UE will switch at the backup CFN.

Another problem is that if the UE receives the RRC reconfiguration message late (i.e., at a time close to the backup CFN), then the UE and the network may also be misaligned regarding which activation time should be used (e.g., the calculated activation time from the handshake or the backup activation time).

SUMMARY

The embodiments described herein include synchronized radio resource control (RRC) procedures that include a media access control (MAC) layer handshake where a wireless device may retransmit the media access control (MAC) control information (MCI) in the hybrid automatic repeat request (HARQ) buffer a predetermined number of times. The handshake may be completed before occurrence of the backup activation time to avoid confusion about whether the reconfiguration should be performed at the calculated activation time or at the backup activation time.

According to some embodiments, a method in a wireless device of reconfiguring radio resources in a wireless communication network comprises: receiving a radio resource control (RRC) message from a network node; obtaining a maximum retransmission threshold value and an indication of a backup reconfiguration time; sending a first control information message to the network node; determining the wireless device has not received a hybrid automatic repeat request (HARQ) acknowledgment (ACK) from the network node in response to the first control information message; determining a number of control information message transmissions is less than the maximum retransmission threshold value; sending a second control information message to the network node; determining the wireless device has not received a HARQ ACK from the network node in response to the second control information message; and performing radio resource reconfiguration at the backup reconfiguration time. The RRC message may comprise a RRC Reconfiguration message. The backup reconfiguration time may comprise a connection frame number (CFN).

In particular embodiments, obtaining the maximum retransmission threshold value comprises receiving the maximum retransmission threshold value in the received RRC message. In other embodiments, obtaining the maximum retransmission threshold value comprises the wireless device being preconfigured with the maximum retransmission threshold value.

In particular embodiments, the method further comprises obtaining a time threshold value, and determining a current time is not within the time threshold value of the backup reconfiguration time before sending the first control information message and before sending the second control information message.

According to some embodiments, a method in a wireless device of reconfiguring radio resources in a wireless communication network comprises: receiving a RRC message from a network node; obtaining a time threshold value and an indication of a backup reconfiguration time; determining a current time is not within the time threshold value of the backup reconfiguration time; and sending a first control information message to the network node.

In particular embodiments, the method further comprises: obtaining a maximum retransmission threshold value; determining the wireless device has not received a HARQ ACK from the network node in response to the first control information message; determining a number of control information message transmissions is less than the maximum retransmission threshold value; determining a current time is not within the time threshold value of the backup reconfiguration time; and sending a second control information message to the network node.

In particular embodiments, obtaining the time threshold value comprises receiving the time threshold value in the received RRC message. In other embodiments, obtaining the time threshold value comprises the wireless device being preconfigured with the time threshold value.

According to some embodiments, a method in a network node of reconfiguring radio resources in a wireless communication network comprises: obtaining a maximum retransmission threshold value and an indication of a backup reconfiguration time; sending a RRC message to a wireless device; receiving a control information message from the wireless device; determining a number of received control information messages exceeds the maximum retransmission threshold value; and performing radio resource reconfiguration at the backup reconfiguration time.

According to some embodiments, a wireless device capable of reconfiguring radio resources in a wireless communication network comprises a processor, a memory, and a power source. The processor is operable to: receive a RRC message from a network node; obtain a maximum retransmission threshold value and an indication of a backup reconfiguration time; send a first control information message to the network node; determine the wireless device has not received a HARQ ACK from the network node in response to the first control information message; determine a number of control information message transmissions is less than the maximum retransmission threshold value; send a second control information message to the network node; determine the wireless device has not received a HARQ ACK from the network node in response to the second control information message; and perform radio resource reconfiguration at the backup reconfiguration time. The backup reconfiguration time may comprise a connection frame number (CFN). The RRC message may comprise a RRC Reconfiguration message.

In particular embodiments, the processor is operable to obtain the maximum retransmission threshold from the received RRC message. In other embodiments, the processor is operable to obtain the maximum retransmission threshold from a preconfigured value.

In particular embodiments, the processor is further operable to obtain a time threshold value, and determine a current time is not within the time threshold value of the backup reconfiguration time before sending the first control information message and before sending the second control information message.

According to some embodiments, a wireless device capable of reconfiguring radio resources in a wireless communication network comprises a processor, a memory, and a power source. The processor is operable to: receive a RRC message from a network node; obtain a time threshold value and an indication of a backup reconfiguration time; determine a current time is not within the time threshold value of the backup reconfiguration time; and send a first control information message to the network node.

In particular embodiments, the processor is further operable to: obtain a maximum retransmission threshold value; determine the wireless device has not received a HARQ ACK from the network node in response to the first control information message; determine a number of control information message transmissions is less than the maximum retransmission threshold value; determine a current time is not within the time threshold value of the backup reconfiguration time; and send a second control information message to the network node.

In particular embodiments, the processor is operable to obtain the time threshold value from the received RRC message. In other embodiments, the processor is operable to obtain the time threshold value from a preconfigured value.

According to some embodiments, a network node capable of reconfiguring radio resources in a wireless communication network comprises a processor and a memory. The processor operable to: obtain a maximum retransmission threshold value and an indication of a backup reconfiguration time; send a RRC message to a wireless device; receive a control information message from the wireless device; determine a number of received control information messages exceeds the maximum retransmission threshold value; and perform radio resource reconfiguration at the backup reconfiguration time.

According to some embodiments, a user equipment (UE) capable of reconfiguring radio resources in a wireless communication network comprises an antenna configured to send and receive wireless signals and radio front-end circuitry connected to the antenna and to the processing circuitry. The radio front-end circuitry is configured to condition signals communicated between the antenna and the processing circuitry. The processing circuitry is configured to: receive a RRC message from a network node; obtain a maximum retransmission threshold value and an indication of a backup reconfiguration time; send a first control information message to the network node; determine the UE has not received a HARQ ACK from the network node in response to the first control information message; determine a number of control information message transmissions is less than the maximum retransmission threshold value; send a second control information message to the network node; determine the UE has not received a HARQ ACK from the network node in response to the second control information message; and perform radio resource reconfiguration at the backup reconfiguration time. The UE further comprises an input interface connected to the processing circuitry and configured to allow input of information into the UE to be processed by the processing circuitry. The UE comprises an output interface connected to the processing circuitry and configured to output information from the UE that has been processed by the processing circuitry. The UE also comprises a battery connected to the processing circuitry and configured to supply power to the UE.

According to some embodiments, a user equipment (UE) capable of reconfiguring radio resources in a wireless communication network comprises an antenna configured to send and receive wireless signals and radio front-end circuitry connected to the antenna and to the processing circuitry. The radio front-end circuitry is configured to condition signals communicated between the antenna and the processing circuitry. The processing circuitry is configured to: receive a RRC message from a network node; obtain a time threshold value and an indication of a backup reconfiguration time; determine a current time is not within the time threshold value of the backup reconfiguration time; and send a first control information message to the network node. The UE further comprises an input interface connected to the processing circuitry and configured to allow input of information into the UE to be processed by the processing circuitry. The UE comprises an output interface connected to the processing circuitry and configured to output information from the UE that has been processed by the processing circuitry. The UE also comprises a battery connected to the processing circuitry and configured to supply power to the UE.

Also disclosed is a computer program product. The computer program product comprises instructions stored on non-transient computer-readable media which, when executed by a processor, performs the acts of: receiving a RRC message from a network node; obtaining a maximum retransmission threshold value and an indication of a backup reconfiguration time; sending a first control information message to the network node; determining the wireless device has not received a HARQ ACK from the network node in response to the first control information message; determining a number of control information message transmissions is less than the maximum retransmission threshold value; sending a second control information message to the network node; determining the wireless device has not received a HARQ ACK from the network node in response to the second control information message; and performing radio resource reconfiguration at the backup reconfiguration time.

Also disclosed is another computer program product. The computer program product comprises instructions stored on non-transient computer-readable media which, when executed by a processor, performs the acts of: receiving a RRC message from a network node; obtaining a time threshold value and an indication of a backup reconfiguration time; determining a current time is not within the time threshold value of the backup reconfiguration time; and sending a first control information message to the network node.

Also disclosed is another computer program product. The computer program product comprises instructions stored on non-transient computer-readable media which, when executed by a processor, performs the acts of: obtaining a maximum retransmission threshold value and an indication of a backup reconfiguration time; sending a RRC message to a wireless device; receiving a control information message from the wireless device; determining a number of received control information messages exceeds the maximum retransmission threshold value; and performing radio resource reconfiguration at the backup reconfiguration time.

Particular embodiments may exhibit some of the following technical advantages. Because radio conditions may vary between networks and also within networks, particular embodiments fine tune the number of times the MCI is retransmitted in the HARQ buffer, which provides flexibility (e.g., different values in different networks and/or under different conditions).

Particular embodiments are flexible and facilitate improved switching times in both good and bad radio environments. When the radio conditions are good, for example, the handshake is fast and a switch to the new configuration is performed quickly. When the radio conditions are not as good, multiple attempts are still faster than waiting until the backup activation time. The backup activation time may be set to a relatively large value for wireless devices in bad conditions.

Particular embodiments indicate to the wireless device a latest threshold time for a handshake attempt to avoid misalignment between the wireless device and the network regarding the proper time to switch to the new configuration. These embodiments are useful in bad radio conditions when the downlink RRC reconfiguration message may arrive after considerable delay. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
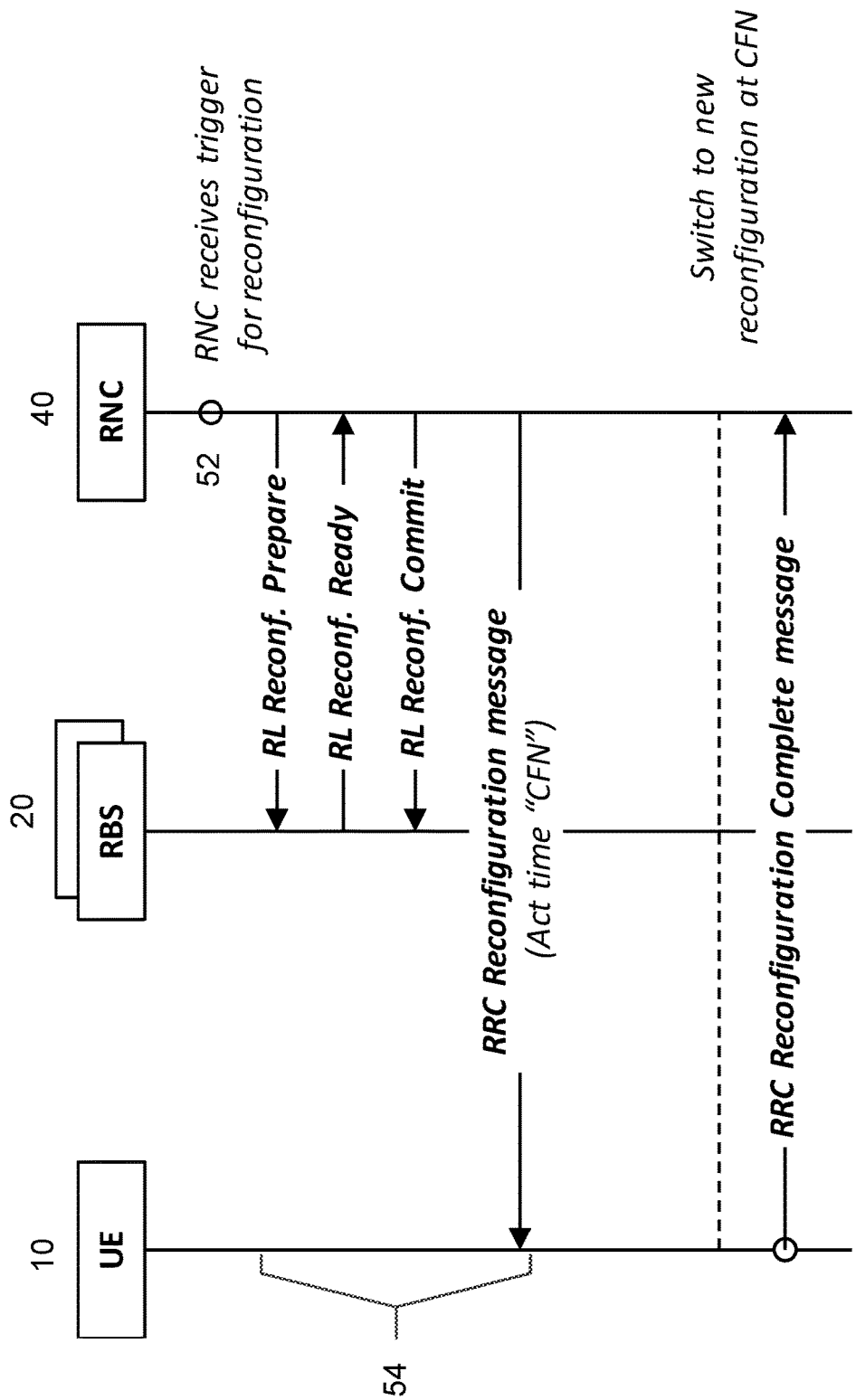
FIG. 1 is a signaling diagram illustrating an example method of a conventional synchronized RRC procedure.
Figure 2:
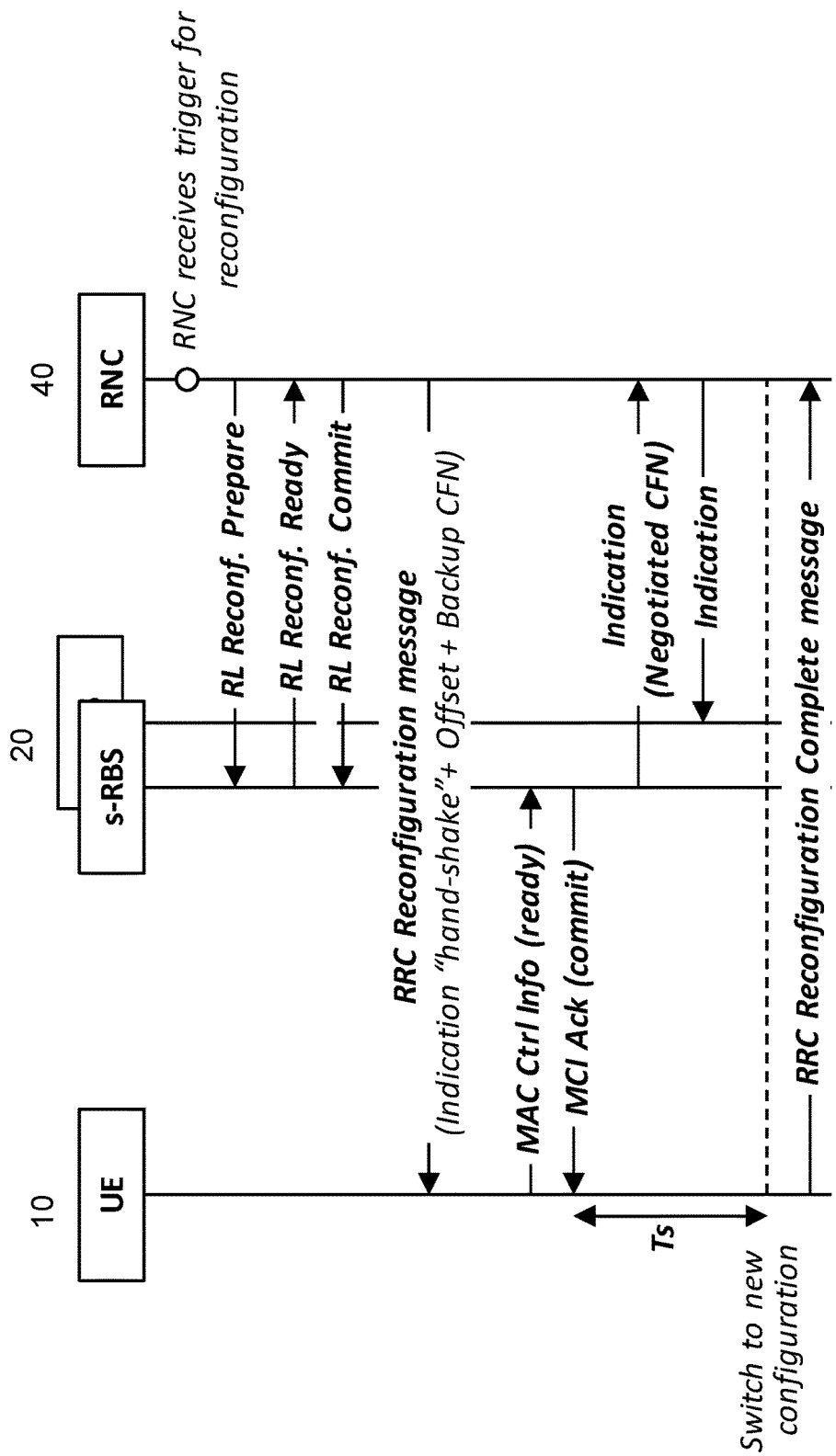
FIG. 2 is a signaling diagram illustrating an example method of a conventional synchronized RRC procedure using a MAC layer handshake.

In a Third Generation Partnership Project (3GPP) wireless network, the radio resource control (RRC) protocol establishes, maintains, and releases the RRC connection between a wireless device and the network. The RRC protocol also establishes, reconfigures, and releases Radio Bearers (RBs) and Signaling Radio Bearers (SRBs). Various RRC procedures (e.g., RB Setup, RB Release, and RB Reconfigure) may reconfigure the radio access bearer (RAB), RB/SRB, transport channel, and/or physical channel parameters. Some reconfigurations use synchronized RRC procedures so that the wireless device and the network change configuration at the same time to avoid a misalignment between the wireless device and the network. A misalignment of configurations may result in dropped communications.

Synchronized RRC procedures may include media access control (MAC) layer handshake procedures, which include exchanging a backup connection frame number (CFN) at which time the switch should occur if the handshake fails. For example, a MAC layer handshake may send an offset and a backup CFN in a downlink RRC reconfiguration message. When the wireless device is ready to switch to the new configuration, the wireless device sends an uplink MAC Control Information (MCI) to the network node. At the hybrid automatic repeat request (HARQ) acknowledgement (ACK) to the MCI, both the wireless device and the network node calculate the activation time by adding the offset to the current CFN. If the wireless device does not receive an ACK to the MCI after a maximum number of retransmissions, then the wireless device will fall back to the backup CFN, and if the network node does not receive an MCI for the reconfiguration, the network node will switch to the new configuration at the backup CFN.

A problem with the MAC level handshake is that if the network node receives the MCI, but the downlink HARQ ACK does not reach the wireless device, then the wireless device and the network node may be misaligned with respect to the switch CFN (e.g., the network node will calculate a switch CFN based on the MCI ACK and the offset, but the wireless device will switch at the backup CFN.

Another problem is that if the wireless device receives the RRC reconfiguration message late (i.e., at a time close to the backup CFN), then the wireless device and the network node may be misaligned regarding the proper activation time (e.g., the calculated activation time from the handshake or the backup activation time).

Particular embodiments obviate the problems described above and include synchronized RRC procedures with a MAC layer handshake where a wireless device retransmits the MCI in the HARQ buffer a predetermined number of times. The handshake may be completed before occurrence of the backup activation time to avoid confusion about whether the reconfiguration should be performed at the calculated activation time or at the backup activation time.

An optimal backup activation time to achieve a low drop rate and an optimal number of MCI retransmissions may vary from network to network. A longer backup activation period enables more opportunities to retransmit the MCI. Particular embodiments may estimate a number of times the MCI should be put into the HARQ buffer for transmission (e.g., the network estimates the number of retransmissions and signals the result to the wireless device, the wireless device performs the estimation using a specified or predetermined algorithm, etc.). Signaling the number of retransmissions facilitates fine tuning the retransmission value in live networks.

Another optimization, which may be used independently or in conjunction with the number of MCI transmissions, is to inform the wireless device not to attempt a handshake if the backup CFN is near, or within a particular threshold time (e.g., if the downlink RRC Reconfiguration message took a long time to reach the wireless device). In particular embodiments, the wireless device may calculate the time remaining until the backup CFN and determine not to perform the handshake if the backup CFN is near, or within a particular time frame. The wireless device may use the maximum number of MCI retransmissions to estimate the time to perform the handshake, and thus determine whether enough time is available to perform the handshake before the backup CFN.

Particular embodiments are flexible and facilitate improved switching times in both good and bad radio environments. When the radio conditions are good, for example, the handshake is fast and a switch to the new configuration is performed quickly. When the radio conditions are not as good, multiple attempts are still faster than waiting until the backup activation time. The backup activation time may be set to a relatively large value for wireless devices in bad conditions.

Particular embodiments indicate to the wireless device a latest threshold time for a handshake attempt to avoid misalignment between the wireless device and the network regarding the proper time to switch to the new configuration. These embodiments are useful in bad radio conditions when the downlink RRC reconfiguration message may arrive after considerable delay.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 3-11 of the drawings, like numerals being used for like and corresponding parts of the various drawings. LTE is used throughout this disclosure as an example cellular system, but the ideas presented herein may apply to other wireless communication systems as well.

Figure 3:
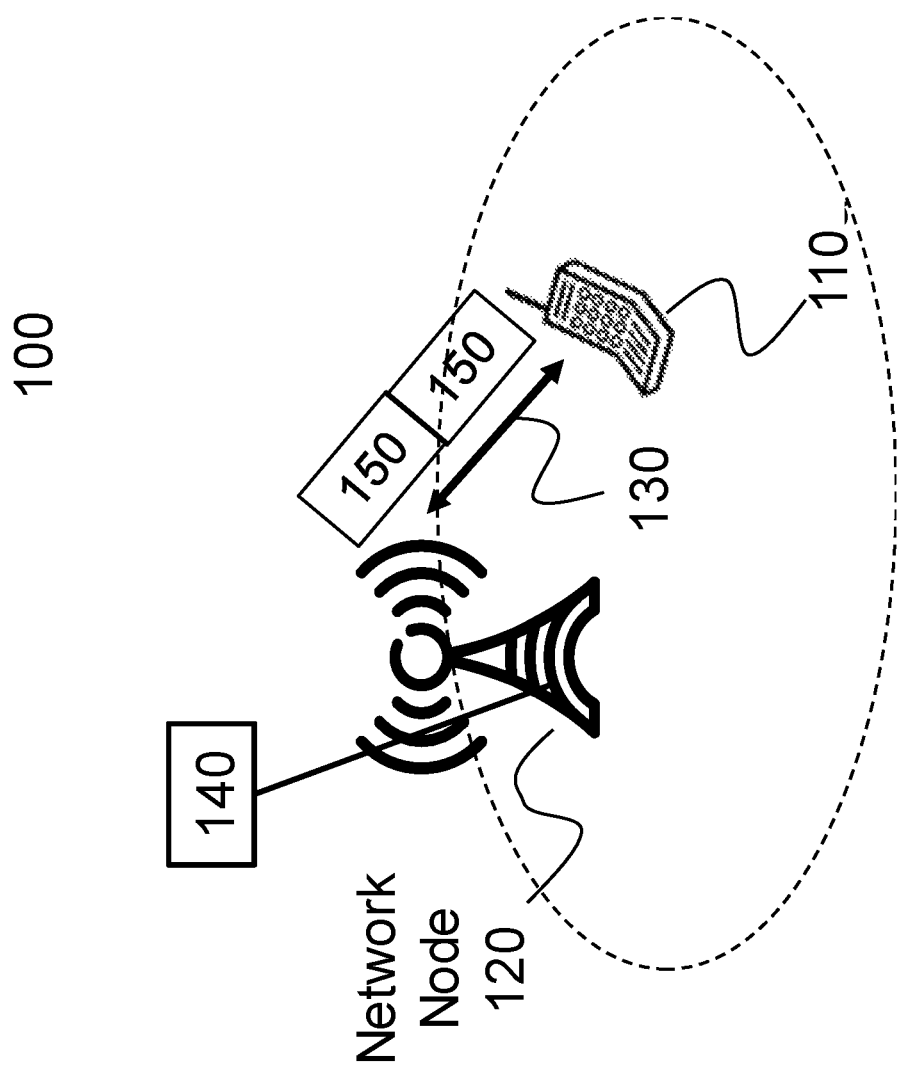
FIG. 3 is a block diagram illustrating an example wireless network, according to some embodiments.

FIG. 3 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from radio network node 120 to wireless devices 110) and uplink transmissions (from wireless devices 110 to radio network node 120).

In certain embodiments, network nodes 120 may interface with radio network controller (RNC) 140. RNC 140 may control network nodes 120 and may provide certain radio resource management functions, mobility management functions, and/or other suitable functions. In certain embodiments, the functions of RNC 140 may be included in network node 120. RNC 140 may interface with a core network node. In certain embodiments, RNC 140 may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless signals 130 may include radio resource control (RRC) messages. The RRC protocol establishes, reconfigures, and releases Radio Bearers (RBs) and Signaling Radio Bearers (SRBs). Various RRC procedures (e.g., RB Setup, RB Release, and RB Reconfigure) may reconfigure the radio access bearer (RAB), RB/SRB, transport channel, and/or physical channel parameters in wireless device 110 from a first or source configuration to a second or target configuration. The reconfiguration may typically be triggered by data activity/inactivity of existing radio bearers or setup/release of new radio bearers.

For some reconfigurations, wireless device 110 and network node 120 change configuration at the same time to avoid a misalignment between which configurations wireless device and network node 120 are using. A misalignment of configurations may result in wireless device 110 being unable to communicate with network node 120. Such reconfigurations use synchronized RRC procedures.

A particular synchronized RRC procedure may include a MAC layer handshake. For example, in particular embodiments the network (e.g., RNC 140) may send RRC prepare and commit messages to network node 120 informing network node 120 of particular handshake parameters, such as a maximum retransmission threshold for retransmitting MCI 150, a time threshold value indicating the latest time for attempting a handshake, and/or a backup CFN. The network (e.g., RNC 140 via network node 120) may send an RRC Reconfiguration message to wireless device 110 that includes the same parameters.

In response to the RRC Reconfiguration message, wireless device 110 may send MCI 150 to network node 120 when wireless device 110 is ready to switch to the new configuration. Network node 120 may respond to MCI 150 with a HARQ ACK. Wireless device 110 and network node 120 may then calculate the activation time based on the time for the HARQ ACK to the MCI and an offset sent in an earlier RRC message.

If the handshake fails for some reason, then wireless device 110 and network node 120 will both switch to the new configuration at a backup activation time. For example, if MCI 150 or its HARQ ACK is lost over the air, then wireless device 110 retransmits MCI 150 according to the conventional HARQ mechanism. If wireless device 110 does not receive the ACK to the MCI after a maximum number of retransmissions, then wireless device 110 falls back to the backup CFN. Similarly, if network node 120 does not receive MCI 150 for the reconfiguration, then network node 120 switches to the new configuration at the backup CFN.

To avoid the problem where network node 120 has received MCI 150 but the downlink HARQ ACK does not reach wireless device 110 resulting in a misalignment between wireless device 110 and network node 120 with respect to the switch CFN (e.g., network node 120 calculates a switch CFN based on the MCI ACK and the offset, but wireless device 110 switches at the backup CFN), particular embodiments include a maximum retransmission threshold. If network node 120 determines that it has received a number of MCI 150 that exceeds the maximum retransmission threshold, then network node 120 performs radio resource reconfiguration at the backup reconfiguration time.

To avoid the problem where wireless device 110 receives the RRC Reconfiguration message late (e.g., at a time close to the backup CFN) resulting in a misalignment between wireless device 110 and network node 120 with respect to which activation time should be used (e.g., the calculated activation time from the handshake or the backup activation time), particular embodiments include a time threshold value. If wireless device 110 determines that a current time is not within the time threshold value of the backup reconfiguration time (i.e., sufficient time for both wireless device 110 and network node 120 to process the handshake), then wireless device 110 may send MCI 150 to network node 120. If wireless device 110, however, determines that the current time is within the time threshold value of the backup reconfiguration time (i.e., insufficient time for both wireless device 110 and network node 120 to process the handshake), then wireless device 110 may not send MCI 150 to network node 120. Both wireless device 110 and network node 120 perform radio resource reconfiguration at the backup reconfiguration time. Particular algorithms for synchronized radio resource reconfiguration are described in more detail with respect to FIGS. 4-9.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10A below. Similarly, a network node may include any suitable combination of hardware and/or software. For example, in particular embodiments, a network node, such as network node 120, may include the components described with respect to FIG. 11A below.

In particular embodiments, to reduce the problem of a possible misalignment between the wireless device and the network regarding the switch CFN if the downlink HARQ ACK does not reach the wireless device, the wireless device may retransmit the MCI using the HARQ buffer a maximum number of times. Because radio conditions are different in different networks and in different scenarios, an optimum value for the MCI maximum retransmission threshold value may vary. To provide optimum flexibility, in particular embodiments the MCI maximum retransmission threshold value may be configurable.

For example, a particular MCI maximum retransmission threshold value may be sent to the wireless device in an existing RRC message (e.g., Radio Bearer Reconfiguration) either as an explicit value stating the number of times for transmissions, or as an implicit value which allows the wireless device to determine how many times the MCI should be transmitted or retransmitted. The network (e.g., RNC 140) may fine-tune the maximum retransmission threshold value and the value for the backup activation time, either together or individually. In addition, in some embodiments the network may specify whether the wireless device should wait (and/or for how long) before the wireless device retransmits the MCI.

In particular embodiments, the network (e.g., RNC 140) may inform the network node of the MCI maximum retransmission threshold value. The network node may use the MCI maximum retransmission threshold value to determine when the handshake fails (i.e., after a number of MCI received exceeds the threshold). Particular embodiments may include the MCI maximum retransmission threshold value in an existing RRC message, such as Radio Link Reconfiguration Prepare or Radio Link Reconfiguration Commit.

Some embodiments, instead of specifying a particular MCI maximum retransmission threshold value, may specify how the wireless device may determine a particular number of times to retransmit the MCI. For example, to avoid transmitting close to or beyond the backup CFN, the wireless device may stop retransmitting MCI if the last HARQ retransmission is within a certain time of the backup CFN. These embodiments may not be as flexible as a configurable MCI maximum retransmission threshold value, but a particular advantage is that it obviates the need to signal the number of retransmissions to the wireless device.

In particular embodiments, to reduce the problem of the backup CFN occurring while the MAC layer handshake is ongoing, a time threshold value informs the wireless device not to attempt a handshake when the downlink RRC message arrives late (i.e., close to the backup activation time) because the remaining time may not be sufficient to perform the handshake procedure. In particular embodiments, the time threshold value may be preconfigured. The wireless device may check the time threshold value before sending an MCI. In other embodiments, the time threshold value may be configurable in an RRC message. A configurable time threshold value may be indicated explicitly as the latest time for a handshake, as a delta from the backup CFN, as an indication that refers to a known delta or explicit time, or another type of reference. In some embodiments, the wireless device checks the time margin towards the backup CFN and does not perform a handshake if the backup CFN is close. The wireless device may use the number of MCIs to be transmitted to estimate the time needed for the handshake. An example of RRC signaling is illustrated in FIG. 4.

Figure 4:
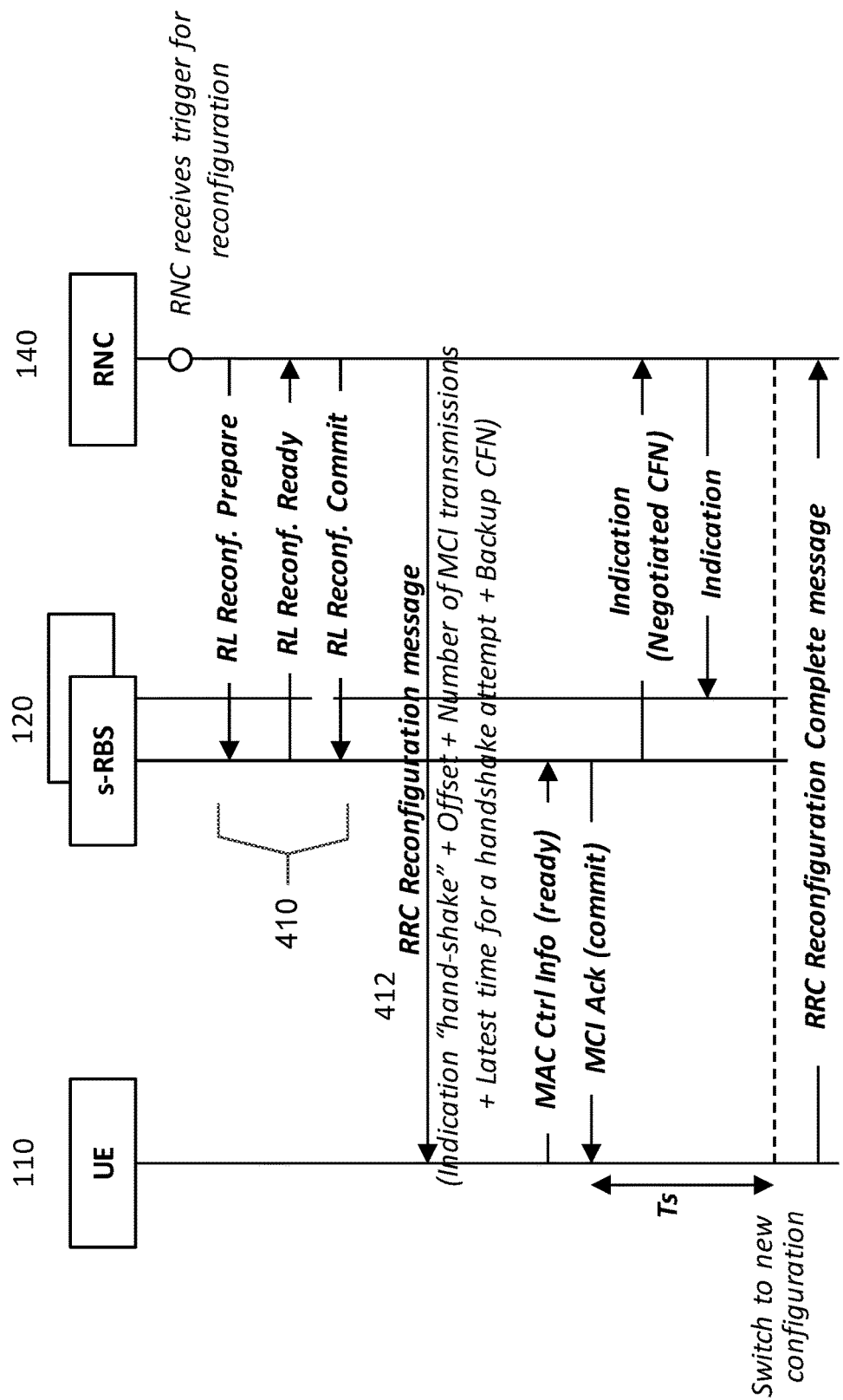
FIG. 4 is a signaling diagram illustrating an example synchronized RRC procedure using a MAC layer handshake, according to particular embodiments.

FIG. 4 is a signaling diagram illustrating an example synchronized RRC procedure using a MAC layer handshake, according to particular embodiments. UE 110 is similar to wireless device 110, RBS 120 is similar to network node 120, and RNC 140 is similar to RNC 140 all described with respect to FIG. 3 above.

At step 410, RNC 140 sends one or more RRC messages to RBS 120 to inform RBS 120 of particular handshake parameters. For example, RNC 140 may send RRC Reconfiguration Prepare and RRC Reconfiguration Commit messages to inform RBS 120 of one or more of a maximum retransmission threshold value for retransmitting MCI, a time threshold value for determining when not to transmit an MCI, and/or a backup CFN.

At step 412, RNC 140 sends an RRC message to UE 110 indicating at least some of the same handshake parameters sent to RBS 120. For example, RNC 140 may send, via RBS 120, a RRC Reconfiguration message indicating one or more of a maximum retransmission threshold value for retransmitting MCI, a time threshold value for determining when not to transmit an MCI, and/or a backup CFN.

In particular embodiments, RNC 140 and RBS 120 may be implemented as part of the same network node, or distributed across different network nodes. In either embodiment, as illustrated, the RRC message is sent to UE 110 via RBS 120. In the embodiments described herein, network node 120 may be described as transmitting or sending an RRC message to wireless device 110, which may refer to an RRC message either originated by or forwarded by network node 120.

When UE 110 is ready to perform the radio resource reconfiguration, UE 110 sends an MCI to RBS 120. Upon receiving the MCI, RBS 120 sends a HARQ ACK to UE 110. RBS 120 calculates the reconfiguration time based on a particular offset. Upon receiving the HARQ ACK, UE 110 also calculates the reconfiguration time based on the particular offset. At the calculated time, both UE 110 and RBS 120 perform the radio resource reconfiguration.

In other embodiments, one or more of a maximum retransmission threshold value for retransmitting MCI and a time threshold value for determining when not to transmit an MCI may be preconfigured in one or both of UE 110 and RBS 120. For example, a particular standard or specification may specify a particular maximum retransmission threshold value and/or a particular time threshold value. UE 110 and RBS 120 may be preconfigured with one or more of the standardized values, in which case the RRC messages need not specify any additional information. Both UE 110 and RBS 120 already know how many times to retransmit the MCI and when not to transmit an MCI because the current time is too close to the backup CFN.

Figure 6:
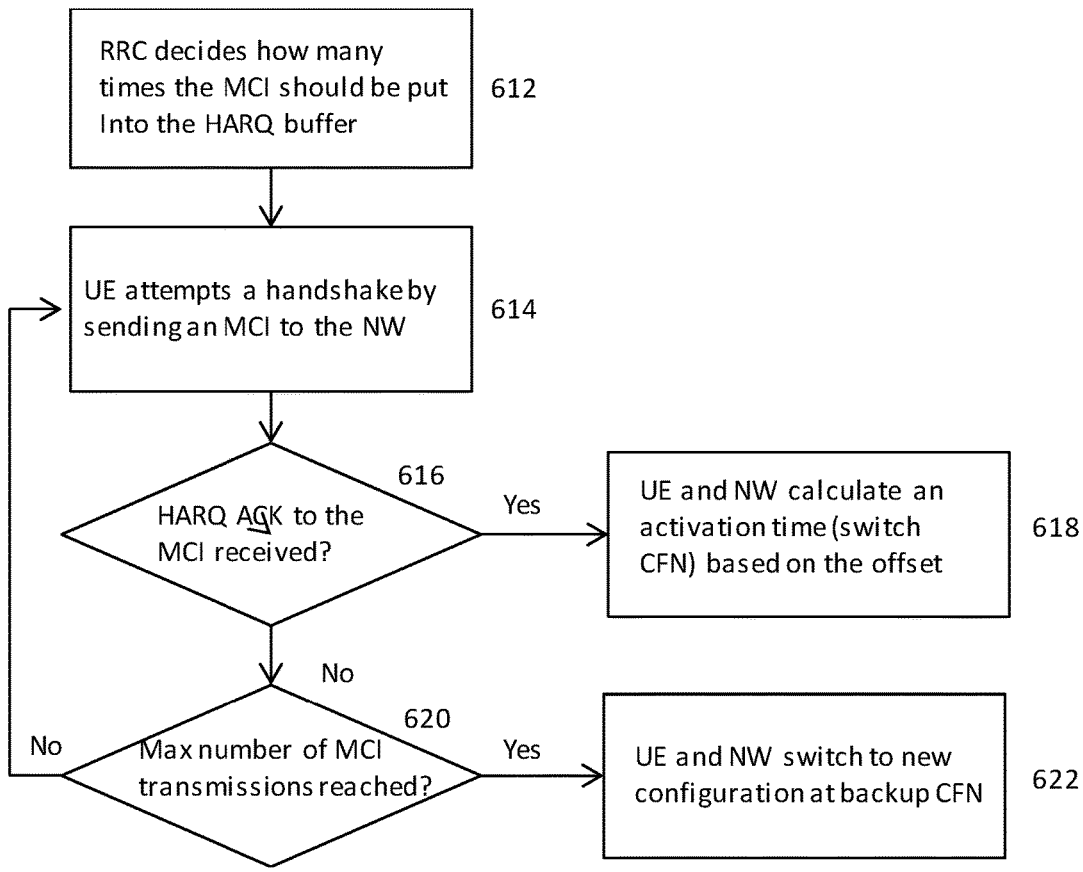
FIG. 6 is an example flow diagram illustrating a MAC layer handshake with an MCI maximum retransmission threshold, according to some embodiments.
Figure 7:
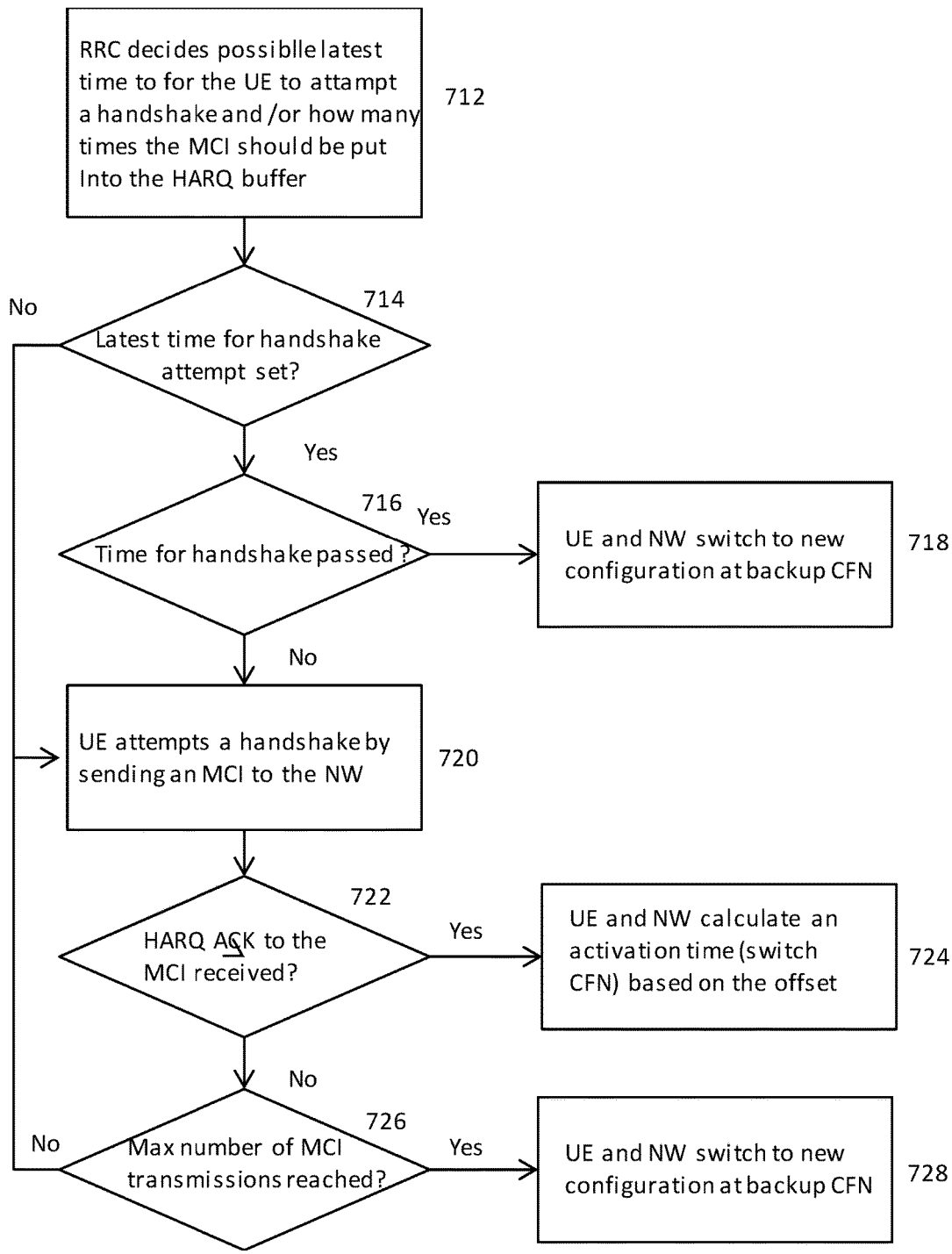
FIG. 7 is an example flow diagram illustrating a MAC layer handshake with an MCI maximum retransmission threshold and a threshold time for transmitting an MCI, according to some embodiments.

Although the embodiments described above include the handshake parameters signaled together and the features operating together, in other embodiments each handshake parameter and associated feature may operate independently of the other. Each parameter may be signaled or predetermined independently. For example, UE 110 may use a threshold time value to determine when not to send an MCI, but UE 110 may retransmit MCI any number of times. Similarly, UE 110 may limit its MCI transmissions to a maximum number of retransmissions, but UE 110 may not check whether the current time is within a time threshold value of the backup CFN before transmitting an MCI. Examples of each feature operating independently are illustrated in FIGS. 5 and 6 and an example of each feature operating together is illustrated in FIG. 7.

Figure 5:
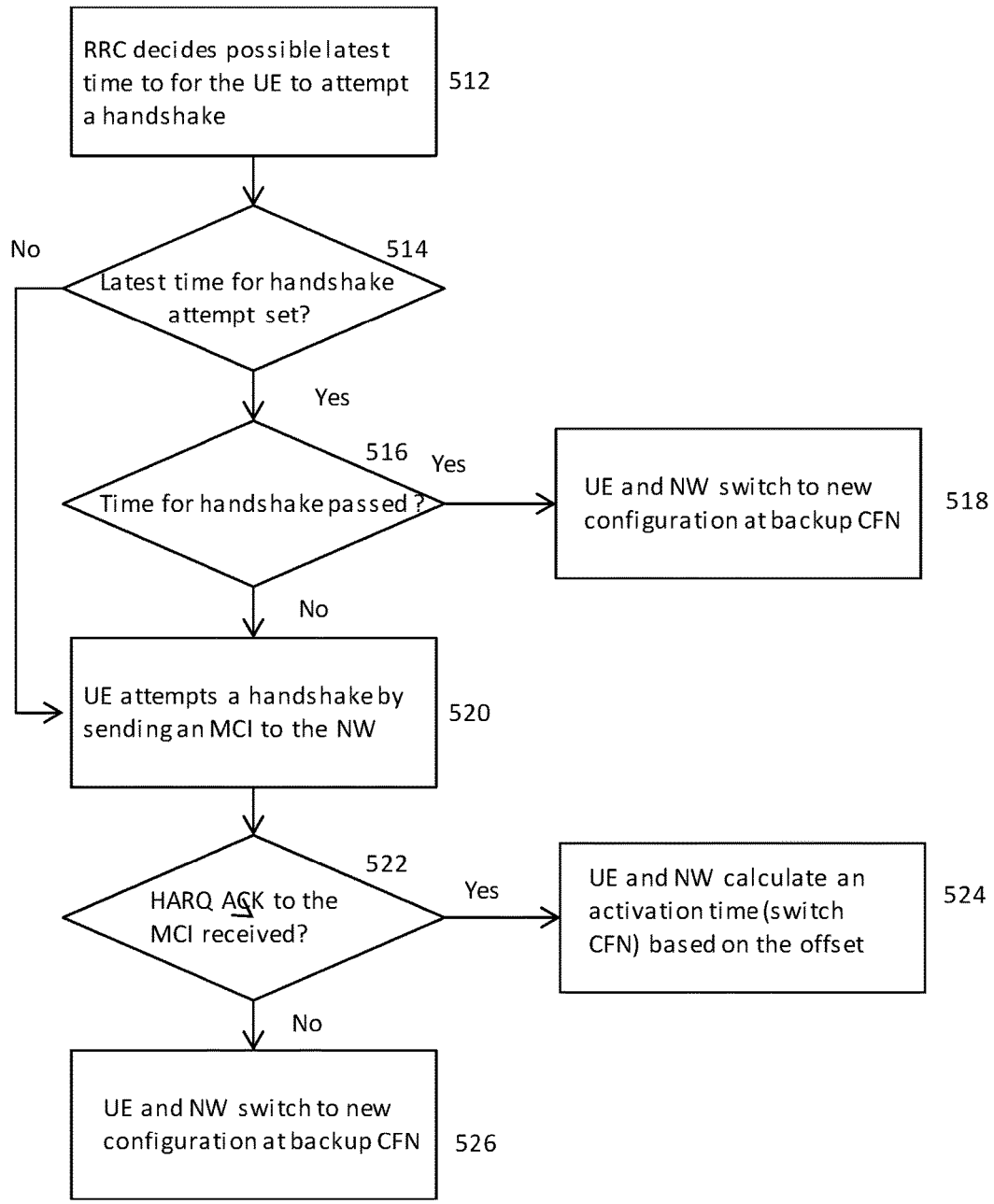
FIG. 5 is an example flow diagram illustrating a MAC layer handshake with a threshold time for transmitting an MCI, according to some embodiments.

FIG. 5 is an example flow diagram illustrating a MAC layer handshake with a threshold time for transmitting an MCI, according to some embodiments. In particular embodiments, one or more steps of FIG. 5 may be performed by the components of wireless network 100 described with respect to FIG. 3.

The method begins at step 512 where a network node, such as network node 120 and/or RNC 140, determines a latest time that wireless device 110 and network node 120 may initiate an MCI handshake. The latest time may be referred to as the threshold time and may be specified by a particular clock time, a particular CFN, a particular offset from a backup CFN, or any other suitable time reference.

In particular embodiments, RNC 140 and/or network node 120 may send the threshold time to wireless device 110. For example, RNC 140 may send a message, such as an RRC Reconfiguration message, via network node 120 to wireless device 110 that includes the threshold time value.

At step 514, wireless device 110 determines whether it has been configured with a threshold time value. In particular embodiments, wireless device 110 may have received a configuration message with a particular time threshold value. In some embodiments, wireless device 110 may be preconfigured with a time threshold value. The predetermined time threshold value may comprise a delta CFN that wireless device 110 may compare to the backup CFN specified for the particular reconfiguration.

If wireless device 110 is not configured with a threshold time value, then the method continues to step 520 where wireless device 110 attempts a handshake by sending an MCI to network node 120. If wireless device 110 is configured with a threshold time value, then the method continues to step 516.

At step 516, wireless device 110 determines whether the time to attempt a handshake has passed. Wireless device 110 may compare the current time to an absolute time threshold value, calculate a delta compared to a particular reference point, such as a backup CFN, or any other suitable determination to determine whether the current time allows enough time to attempt a handshake procedure.

If wireless device 110 determines that the time for attempting a handshake has passed, then the method continues to step 518, where both wireless device 110 and network node 120 switch to the new configuration at the backup CFN. If wireless device 110 determines that the time for attempting a handshake has not passed, then the method continues to step 520 where wireless device 110 attempts a handshake by sending an MCI to network node 120.

At step 522, wireless device 110 determines whether it receives a HARQ ACK in response to the MCI sent to network node 120. If wireless device 110 receives a HARQ ACK from network node 120, then the method continues to step 524, where both wireless device 110 and network node 120 calculate an activation time (e.g., switch CFN). In particular embodiments the activation time may be calculated based on a known offset from the current time or frame number. If wireless device 110 does not receive a HARQ ACK from network node 120, then the method continues to step 526, where both wireless device 110 and network node 120 perform the radio resource reconfiguration at the backup CFN.

FIG. 6 is an example flow diagram illustrating a MAC layer handshake with an MCI maximum retransmission threshold, according to some embodiments. In particular embodiments, one or more steps of FIG. 6 may be performed by the components of wireless network 100 described with respect to FIG. 3.

The method begins at step 612 where a network node, such as network node 120 and/or RNC 140, determines a maximum retransmission threshold (i.e., how many times the MCI should be retransmitted in the HARQ buffer). In particular embodiments, RNC 140 and/or network node 120 may send the maximum retransmission threshold value to wireless device 110. For example, RNC 140 may send a message, such as an RRC Reconfiguration message, via network node 120 to wireless device 110 that includes the maximum retransmission threshold value. In some embodiments, wireless device 110 may be preconfigured with the maximum retransmission threshold value.

At step 614, the wireless device attempts a handshake by sending an MCI to the network node. For example, wireless device 110 may send an MCI to network node 120.

At step 616, the wireless device determines whether it receives a HARQ ACK in response to the MCI. For example, wireless device 110 may determine whether it receives a HARQ ACK from network node 120. If the wireless device does receive the HARQ ACK, then the method continues to step 618, where both the wireless device and the network node calculate on activation time (e.g., switch CFN). In particular embodiments the activation time may be calculated based on a known offset from the current time or frame number. If the wireless device does not receive the HARQ ACK, then the method continues to step 620.

At step 620, the wireless device determines whether the number of MCI transmitted is below the maximum retransmission threshold value. If the number of MCI transmitted is below the maximum retransmission threshold value, then the method returns to step 614 where the wireless device sends another MCI to the network node. For example, wireless device 110 may put the MCI into the HARQ buffer for retransmission to network node 120.

If the number of MCI transmitted exceeds the maximum retransmission threshold value, then the method continues to step 622, where both the wireless device and the network node perform radio resource reconfiguration at the backup CFN.

FIG. 7 is an example flow diagram illustrating a MAC layer handshake with an MCI maximum retransmission threshold and a threshold time for transmitting an MCI, according to some embodiments. In particular embodiments, one or more steps of FIG. 7 may be performed by the components of wireless network 100 described with respect to FIG. 3.

The method begins at step 712 where a network node, such as network node 120 and/or RNC 140, determines a latest time that wireless device 110 and network node 120 may initiate an MCI handshake. The latest time may be referred to as the threshold time and may be specified by a particular clock time, a particular CFN, a particular offset from a backup CFN, or any other suitable time reference. The network node may also determine a maximum retransmission threshold (i.e., how many times the MCI should be retransmitted in the HARQ buffer).

In particular embodiments, RNC 140 and/or network node 120 may send one or both of the threshold time and the maximum retransmission threshold to wireless device 110. For example, RNC 140 may send a message, such as an RRC Reconfiguration message, via network node 120 to wireless device 110 that includes the threshold time value and/or the maximum retransmission threshold value.

At step 714, wireless device 110 determines whether it has been configured with a threshold time value. In particular embodiments, wireless device 110 may have received a configuration message with a particular time threshold value. In some embodiments, wireless device 110 may be preconfigured with a time threshold value. The predetermined time threshold value may comprise a delta CFN that wireless device 110 may compare to the backup CFN specified for the particular reconfiguration.

If wireless device 110 is not configured with a threshold time value, then the method continues to step 720 where wireless device 110 attempts a handshake by sending an MCI to network node 120. If wireless device 110 is configured with a threshold time value, then the method continues to step 716.

At step 716, wireless device 110 determines whether the time to attempt a handshake has passed. Wireless device 110 may compare the current time to an absolute time threshold value, calculate a delta compared to a particular reference point, such as a backup CFN, or any other suitable determination to determine whether the current time allows enough time to attempt a handshake procedure.

If wireless device 110 determines that the time for attempting a handshake has passed, then the method continues to step 718, where both wireless device 110 and network node 120 switch to the new configuration at the backup CFN. If wireless device 110 determines that the time for attempting a handshake has not passed, then the method continues to step 720 where wireless device 110 attempts a handshake by sending an MCI to network node 120.

At step 722, wireless device 110 determines whether it receives a HARQ ACK in response to the MCI sent to network node 120. If wireless device 110 receives a HARQ ACK from network node 120, then the method continues to step 724, where both wireless device 110 and network node 120 calculate an activation time (e.g., switch CFN). In particular embodiments the activation time may be calculated based on a known offset from the current time or frame number. If wireless device 110 does not receive a HARQ ACK from network node 120, then the method continues to step 726.

At step 726, the wireless device determines whether the number of MCI transmitted is below the maximum retransmission threshold value. If the number of MCI transmitted is below the maximum retransmission threshold value, then the method returns to step 720 where the wireless device sends another MCI to the network node. For example, wireless device 110 may put the MCI into the HARQ buffer for retransmission to network node 120. In other embodiments, the method may return to step 716, where wireless device 110 determines whether the time to attempt a handshake has passed before retransmitting another MCI at step 720.

If the number of MCI transmitted exceeds the maximum retransmission threshold value, then the method continues to step 728, where both the wireless device and the network node perform radio resource reconfiguration at the backup CFN.

Figure 8:
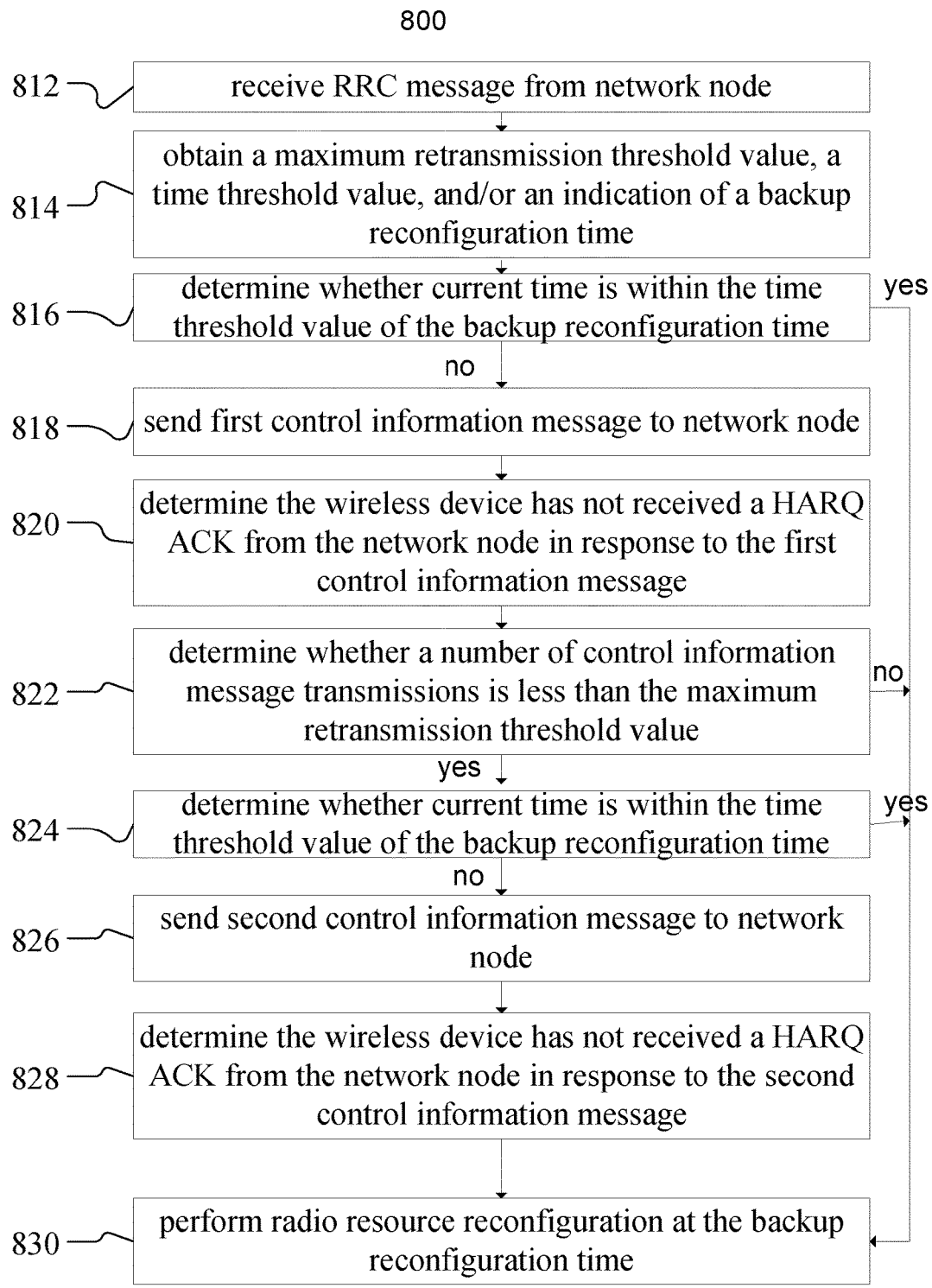
FIG. 8 is a flow diagram illustrating an example method in a wireless device of reconfiguring radio resources in a wireless communication network, according to some embodiments.
Figure 9:
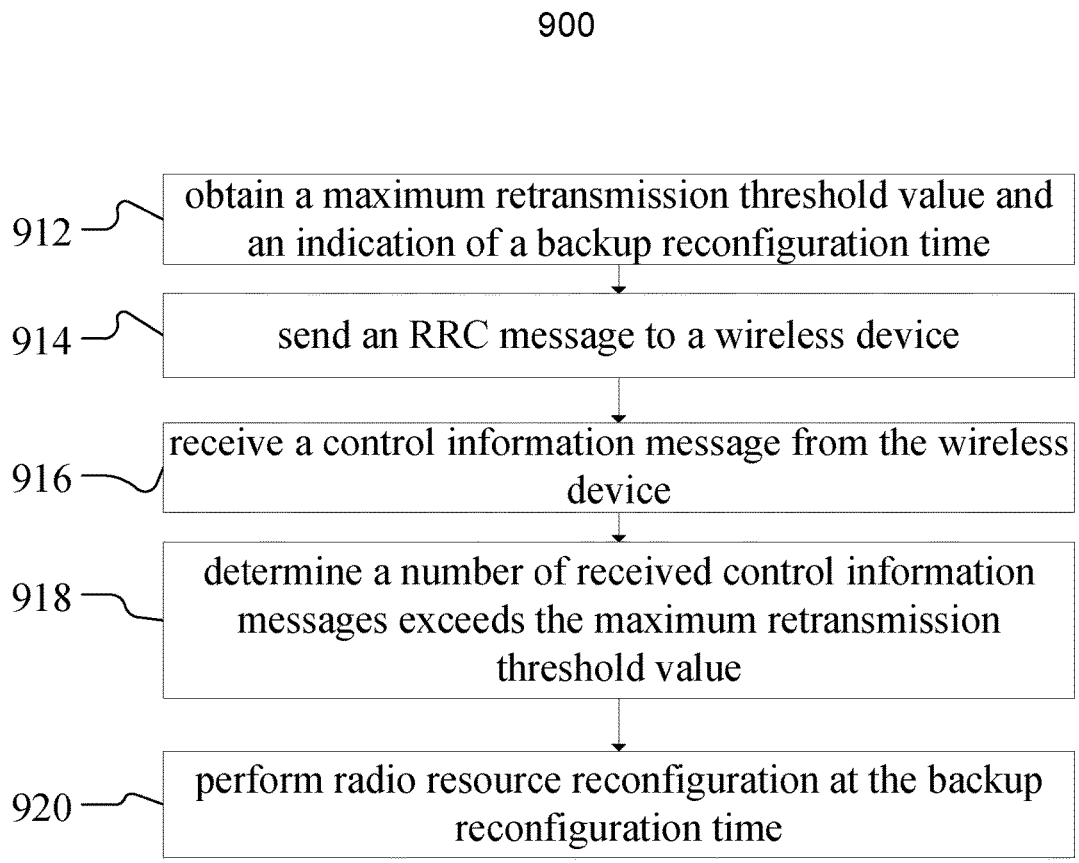
FIG. 9 is a flow diagram illustrating an example method in a network node of reconfiguring radio resources in a wireless communication network, according to some embodiments.

The examples described with respect to FIGS. 4-7 may be generally represented by the flowcharts in FIG. 8 (with respect to the wireless device) and FIG. 9 (with respect to the network node).

FIG. 8 is a flow diagram illustrating an example method in a wireless device of reconfiguring radio resources in a wireless communication network, according to some embodiments. In particular embodiments, one or more steps of FIG. 8 may be performed by a wireless device 110 of wireless network 100 described with respect to FIG. 3.

The method begins at step 812, where a wireless device receives an RRC message from a network node. For example, wireless device 110 may receive an RRC Reconfiguration message from network node 120. In some embodiments, the RRC message may comprise a RRC Setup or RRC Release message. In particular embodiments, the RRC message may originate from an RNC, such as RNC 140, and network node 120 may forward or relay the RRC message to wireless device 110. In some embodiments, network node 120 may include RNC functionality and network node 120 may send the RRC message to wireless device 110.

At step 814, the wireless device obtains a maximum retransmission threshold value, a time threshold value, and/or an indication of a backup reconfiguration time. As one example, wireless device 110 may obtain one or more of the maximum retransmission threshold value, the time threshold value, and/or the indication of the backup reconfiguration time from the received RRC message.

As another example, one or more of the maximum retransmission threshold value, the time threshold value, and/or the indication of the backup reconfiguration time may be predetermined, such as specified by a standard. For example, the maximum retransmission threshold value may be specified by a standard as a particular number of retransmissions. The time threshold value may be specified as a particular number of frame number preceding the backup CFN. The backup reconfiguration time may be specified as a particular number of frame numbers after the RRC message is received. In particular embodiments, wireless device 110 may be initialized with the predetermined values. Wireless device 110 may obtain one or more of the maximum retransmission threshold value, the time threshold value, and/or the indication of the backup reconfiguration time by retrieving the predetermined values from memory.

At step 816, the wireless device determines whether current time is within the time threshold value of the backup reconfiguration time. For example, the time threshold value may comprise a particular number (X) of frame numbers offset from the backup CFN. Wireless device 110 may determine whether the current frame number is within X frame numbers of the backup CFN. In some embodiments the time threshold value may comprise a particular clock time, a particular CFN, a particular offset from a backup CFN, or any other suitable time reference.

If wireless device 110 determines the current time is within the time threshold value of the backup reconfiguration time (i.e., insufficient time to perform the handshake procedure), then the method continues to step 830 where both wireless device 110 and network node 120 perform radio resource reconfiguration at the backup reconfiguration time.

A particular advantage of step 816 is to reduce the problem of the backup CFN occurring while the MAC layer handshake is ongoing. The time threshold value informs the wireless device not to attempt a handshake when the downlink RRC message arrives late (i.e., close to the backup activation time) because the remaining time may not be sufficient to perform the handshake procedure.

If wireless device 110 determines the current time is not within the time threshold value of the backup reconfiguration time (i.e., sufficient time to perform the handshake procedure), then the method continues to step 818.

At step 818, the wireless device sends a first control information message to the network node. For example, wireless device 110 sends a first MCI 150 to network node 120.

At step 820, the wireless device determines it has not received a HARQ ACK from the network node in response to the first control information message. For example, wireless device 110 determines it has not received a HARQ ACK for the first MCI 150 from network node 120.

At step 822, the wireless device determines whether a number of control information message transmissions is less than the maximum retransmission threshold value. For example, wireless device 110 may count the number of times it has retransmitted the same MCI 150 to network node 120. Wireless device 110 may determine that the number of MCI 150 transmissions is less than the maximum retransmission threshold value (e.g., less than 1, 2, 3, 5, 10, or any suitable threshold value). If the number of MCI 150 transmissions exceeds the maximum retransmission threshold value, then the method continues to step 830 where both wireless device 110 and network node 120 perform radio resource reconfiguration at the backup reconfiguration time. Otherwise, the method continues to step 824.

At step 824, the wireless device determines whether current time is within the time threshold value of the backup reconfiguration time. For example, wireless device 110 may perform the same determination as in step 816 to determine whether wireless device 110 has sufficient time to continue the handshake procedure.

If wireless device 110 determines the current time is within the time threshold value of the backup reconfiguration time (i.e., insufficient time to perform the handshake procedure), then the method continues to step 830 where both wireless device 110 and network node 120 perform radio resource reconfiguration at the backup reconfiguration time.

If wireless device 110 determines the current time is not within the time threshold value of the backup reconfiguration time (i.e., sufficient time to perform the handshake procedure), then the method continues to step 826.

At step 826, the wireless device sends a second control information message to the network node. For example, wireless device 110 sends a second MCI 150 to network node 120.

At step 828, the wireless device determines it has not received a HARQ ACK from the network node in response to the second control information message. For example, wireless device 110 determines it has not received a HARQ ACK for the second MCI 150 from network node 120.

In particular embodiments, the wireless device may return to step 822 any number of times until the maximum retransmission threshold value is exceeded. After the maximum retransmission threshold value is exceeded, the method continues to step 830 where both wireless device 110 and network node 120 perform radio resource reconfiguration at the backup reconfiguration time.

Modifications, additions, or omissions may be made to method 800. For example, particular embodiments may omit step 824. Particular embodiments may determine whether current time is within the time threshold value of the backup reconfiguration time once at step 816 and not repeat the determination before each retransmission. Additionally, one or more steps in method 800 of FIG. 8 may be performed in parallel or in any suitable order. The steps of method 800 may be repeated over time as necessary.

FIG. 9 is a flow diagram illustrating an example method in a network node of reconfiguring radio resources in a wireless communication network, according to some embodiments. In particular embodiments, one or more steps of FIG. 9 may be performed by a network node 120 of wireless network 100 described with respect to FIG. 3.

The method begins at step 912, where a network node obtains a maximum retransmission threshold value and an indication of a backup reconfiguration time. As one example, network node 120 may receive RRC messages, such as RRC Prepare and RRC Commit, that include a maximum retransmission threshold value and/or an indication of a backup reconfiguration time.

As another example, one or both of the maximum retransmission threshold value and the backup reconfiguration time may be predetermined, such as specified by a standard. For example, the maximum retransmission threshold value may be specified by a standard as a particular number of retransmissions. The backup reconfiguration time may be specified as a particular number of frame numbers after the RRC message is received. In particular embodiments, network node 120 may be initialized with the predetermined values. Network node 120 may obtain one or both of the maximum retransmission threshold value and the indication of the backup reconfiguration time by retrieving the predetermined values from memory.

At step 914, the network node sends an RRC message to a wireless device. For example, network node 120 may send an RRC Reconfiguration message to wireless device 110. In particular embodiments, network node 120 may originate the RRC Reconfiguration message or network node 120 may relay or forward a RRC Reconfiguration message originated from another node, such as RNC 140.

At step 916, the network node receives a control information message from the wireless device. For example, network node 120 receives MCI 150 from wireless device 110.

At step 918, the network node determines a number of received control information messages exceeds the maximum retransmission threshold value. For example, network node 120 may count the number of times it receives the same MCI 150 from wireless device 110. Even though network node may respond to MCI 150 with a HARQ ACK, network node 120 may determine that wireless device 110 is not receiving the HARQ ACK because wireless device 110 continues to retransmit the same MCI 150. Upon determining the number of received MCI 150 exceeds the maximum retransmission threshold value, network node 120 continues to step 920, where network node 120 performs radio resource reconfiguration at the backup reconfiguration time.

A particular advantage of method 900 is to avoid the problem where network node 120 has received an MCI 150 but the downlink HARQ ACK does not reach wireless device 110 resulting in a misalignment between wireless device 110 and network node 120 with respect to the switch CFN (e.g., network node 120 calculates a switch CFN based on the MCI ACK and the offset, but wireless device 110 switches at the backup CFN). If network node 120 determines that it has received a number of MCI 150 that exceeds the maximum retransmission threshold, then both wireless device 110 and network node 120 perform radio resource reconfiguration at the backup reconfiguration time.

Modifications, additions, or omissions may be made to method 900. Additionally, one or more steps in method 900 of FIG. 9 may be performed in parallel or in any suitable order. The steps of method 900 may be repeated over time as necessary.

Figure 10A:
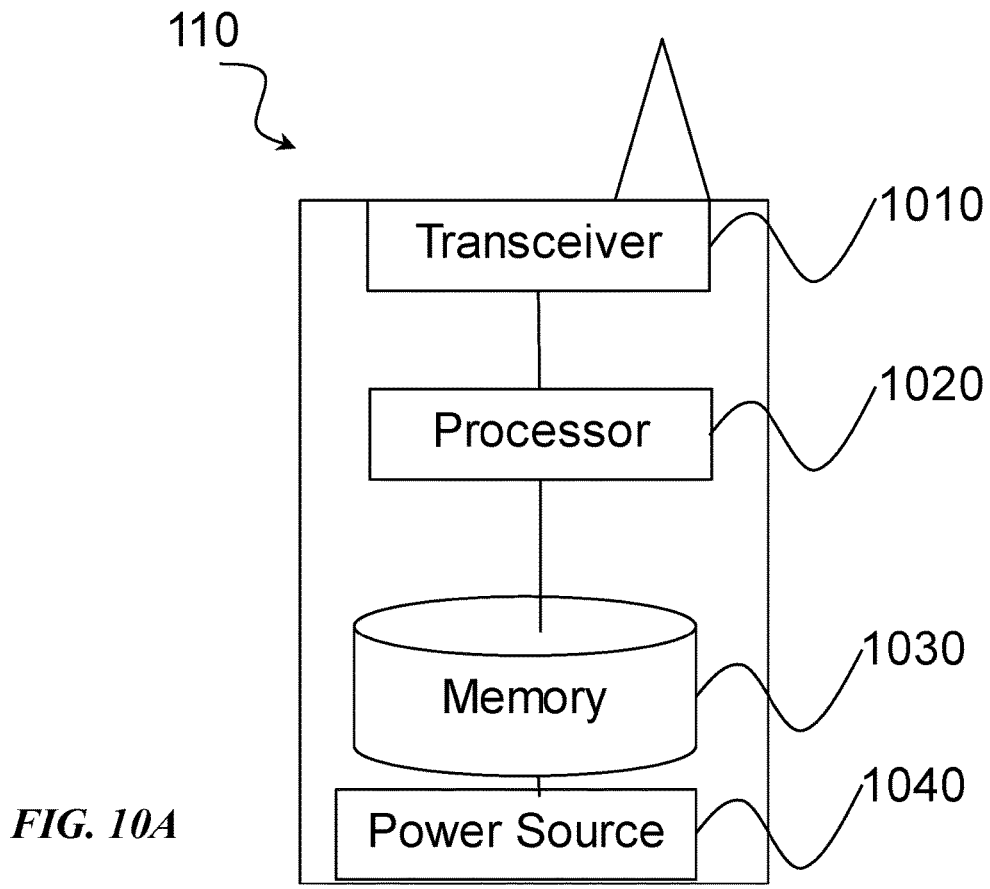
FIG. 10A is a block diagram illustrating an example embodiment of a wireless device.

FIG. 10A is a block diagram illustrating an example embodiment of a wireless device. The wireless device is an example of the wireless devices 110 illustrated in FIG. 3. In particular embodiments, the wireless device is capable of receiving a RRC message from a network node and obtaining a maximum retransmission threshold value and an indication of a backup reconfiguration time. The wireless device is operable to send control information messages (e.g., MCI) to the network node. The wireless device may determine whether it has received a HARQ ACK from the network node in response to the control information message and determine whether a number of control information message transmissions is less than the maximum retransmission threshold value. In particular embodiments, the wireless device may obtain a time threshold value, and may determine a current time is not within the time threshold value of the backup reconfiguration time. The wireless device may perform radio resource reconfiguration at the backup reconfiguration time or at a calculated time.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1010, processor 1020, memory 1030, and power supply 1040. In some embodiments, transceiver 1010 facilitates transmitting wireless signals to and receiving wireless signals from wireless network node 120 (e.g., via an antenna), processor 1020 executes instructions to provide some or all of the functionality described herein as provided by the wireless device, and memory 1030 stores the instructions executed by processor 1020. Power supply 1040 supplies electrical power to one or more of the components of wireless device 110, such as transceiver 1010, processor 1020, and/or memory 1030.

Processor 1020 includes any suitable combination of hardware and software implemented in one or more integrated circuits or modules to execute instructions and manipulate data to perform some or all of the described functions of the wireless device. In some embodiments, processor 1020 may include, for example, one or more computers, one more programmable logic devices, one or more central processing units (CPUs), one or more microprocessors, one or more applications, and/or other logic, and/or any suitable combination of the preceding. Processor 1020 may include analog and/or digital circuitry configured to perform some or all of the described functions of wireless device 110. For example, processor 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power supply 1040 is generally operable to supply electrical power to the components of wireless device 110. Power supply 1040 may include any suitable type of battery, such as lithium-ion, lithium-air, lithium polymer, nickel cadmium, nickel metal hydride, or any other suitable type of battery for supplying power to a wireless device.

In particular embodiments, processor 1020 in communication with transceiver 1010 receives a radio resource control (RRC) message; obtains a maximum retransmission threshold value and an indication of a backup reconfiguration time; sends a control information message; determines the wireless device has not received a HARQ ACK in response to the control information message; determines a number of control information message transmissions is less than the maximum retransmission threshold value; and performs radio resource reconfiguration. In some embodiments, processor 1020 in communication with transceiver 1010 obtains a time threshold value and determines a current time is not within the time threshold value of the backup reconfiguration time before sending a control information message.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

Figure 10B:
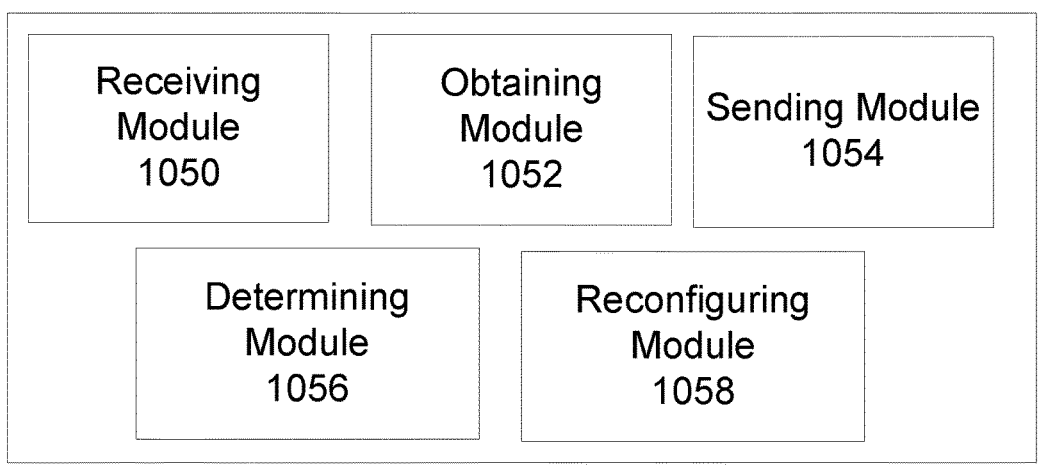
FIG. 10B is a block diagram illustrating example components of a wireless device.

FIG. 10B is a block diagram illustrating example components of a wireless device 110. The components may include receiving module 1050, obtaining module 1052, sending module 1054, determining module 1056, and reconfiguring module 1058.

Receiving module 1050 may perform the receiving functions of wireless device 110. For example, receiving module 1050 may receive a RRC message from a network node. In certain embodiments, receiving module 1050 may include or be included in processor 1020. In particular embodiments, receiving module 1050 may communicate with obtaining module 1052, sending module 1054, determining module 1056, and reconfiguring module 1058.

Obtaining module 1052 may perform the obtaining functions of wireless device 110. For example, obtaining module 1052 may obtain a maximum retransmission threshold value, a time threshold value, and/or an indication of a backup reconfiguration time. In certain embodiments, obtaining module 1052 may include or be included in processor 1020. In particular embodiments, obtaining module 1052 may communicate with receiving module 1050, sending module 1054, determining module 1056, and reconfiguring module 1058.

Sending module 1054 may perform the sending functions of wireless device 110. For example, sending module 1054 may send control information messages (e.g., MCI) to network node 120. In certain embodiments, sending module 1054 may include or be included in processor 1020. In particular embodiments, sending module 1054 may communicate with receiving module 1050, obtaining module 1052, determining module 1056, and reconfiguring module 1058.

Determining module 1056 may perform the determining functions of wireless device 110. For example, determining module 1056 may determine whether a current time is within the time threshold value of the backup reconfiguration time, determine whether the wireless device has received a HARQ ACK from the network node in response to a control information message, and determine whether a number of control information message transmissions is less than a maximum retransmission threshold value. In certain embodiments, determining module 1056 may include or be included in processor 1020. In particular embodiments, determining module 1056 may communicate with receiving module 1050, obtaining module 1052, sending module 1054, and reconfiguring module 1058.

Reconfiguring module 1058 may perform the reconfiguring functions of wireless device 110. For example, reconfiguring module 1058 may perform radio resource reconfiguration for wireless device 110. In certain embodiments, reconfiguring module 1058 may include or be included in processor 1020. In particular embodiments, reconfiguring module 1058 may communicate with receiving module 1050, obtaining module 1052, sending module 1054, and determining module 1056.

Figure 11A:
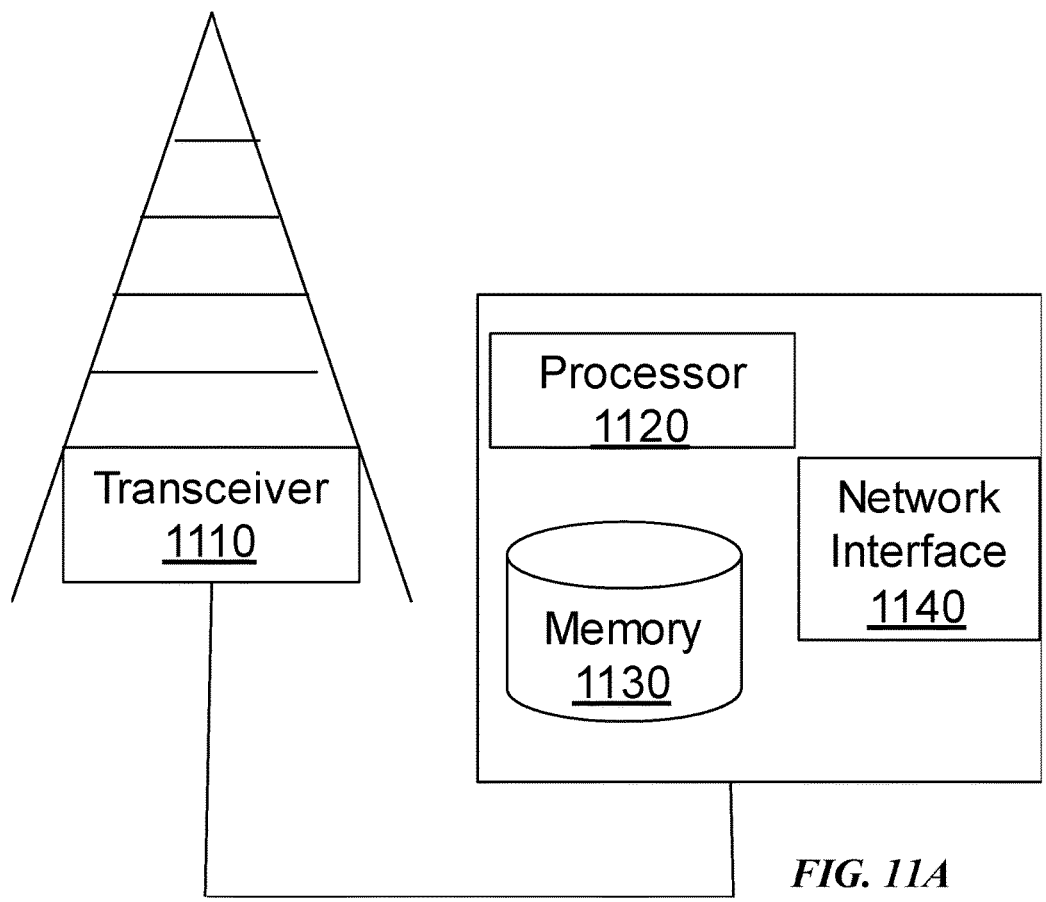
FIG. 11A is a block diagram illustrating an example embodiment of a network node.

FIG. 11A is a block diagram illustrating an example embodiment of a network node. The network node is an example of the network node 120 illustrated in FIG. 3. The network node is capable of obtaining a maximum retransmission threshold value and an indication of a backup reconfiguration time. The network node may send (or forward, relay, etc.) a RRC message to a wireless device. The network node may receive a control information message (e.g., MCI) from the wireless device and may determine whether a number of received control information messages exceeds the maximum retransmission threshold value. The network node may perform radio resource reconfiguration.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1110, at least one processor 1120, at least one memory 1130, and at least one network interface 1140. Transceiver 1110 facilitates transmitting wireless signals to and receiving wireless signals from a wireless device, such as wireless devices 110 (e.g., via an antenna); processor 1120 executes instructions to provide some or all of the functionality described above as being provided by a network node 120; memory 1130 stores the instructions executed by processor 1120; and network interface 1140 communicates signals to backend network components, such as a gateway, switch, router, Internet, Public Switched Telephone Network (PSTN), controller, and/or other network nodes 120. Processor 1120 and memory 1130 can be of the same types as described with respect to processor 1020 and memory 1030 of FIG. 10A above.

In some embodiments, network interface 1140 is communicatively coupled to processor 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network.

In particular embodiments, processor 1120 in communication with transceiver 1110 obtains a maximum retransmission threshold value and an indication of a backup reconfiguration time; sends a RRC message to a wireless device; receives a control information message (e.g., MCI) from the wireless device; determines whether a number of received control information messages exceeds the maximum retransmission threshold value; and performs radio resource reconfiguration.

Other embodiments of network node 120 include additional components (beyond those shown in FIG. 11) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 11B:
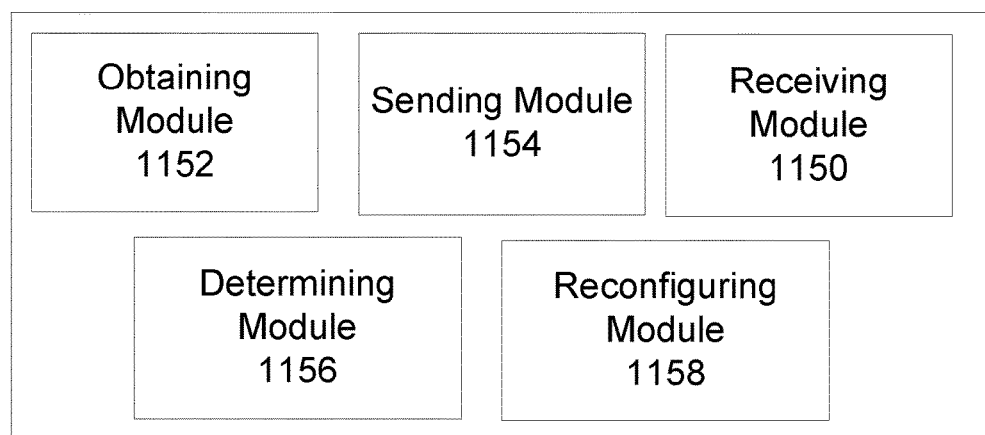
FIG. 11B is a block diagram illustrating example components of a network node.

FIG. 11B is a block diagram illustrating example components of a network node 120. The components may include receiving module 1150, obtaining module 1152, sending module 1154, determining module 1056, and reconfiguring module 1058.

Receiving module 1150 may perform the receiving functions of network node 120. For example, receiving module 1150 may receive a control information message (e.g., MCI) from wireless device 110. In certain embodiments, receiving module 1150 may include or be included in processor 1120. In particular embodiments, receiving module 1150 may communicate with obtaining module 1152, sending module 1154, determining module 1156, and reconfiguring module 1158.

Obtaining module 1152 may perform the obtaining functions of network node 120. For example, obtaining module 1152 may obtain a maximum retransmission threshold value and/or an indication of a backup reconfiguration time. In certain embodiments, obtaining module 1152 may include or be included in processor 1120. In particular embodiments, obtaining module 1152 may communicate with receiving module 1150, sending module 1154, determining module 1156, and reconfiguring module 1158.

Sending module 1154 may perform the sending functions of network node 120. For example, sending module 1154 may send RRC messages to wireless device 110. In certain embodiments, sending module 1154 may include or be included in processor 1120. In particular embodiments, sending module 1154 may communicate with receiving module 1150, obtaining module 1152, determining module 1156, and reconfiguring module 1158.

Determining module 1156 may perform the determining functions of network node 120. For example, determining module 1156 may determine whether a number of received control information message transmissions exceeds the maximum retransmission threshold value. In certain embodiments, determining module 1156 may include or be included in processor 1120. In particular embodiments, determining module 1156 may communicate with receiving module 1150, obtaining module 1152, sending module 1154, and reconfiguring module 1158.

Reconfiguring module 1158 may perform the reconfiguring functions of network node 120. For example, reconfiguring module 1158 may perform radio resource reconfiguration for network node 120. In certain embodiments, reconfiguring module 1158 may include or be included in processor 1120. In particular embodiments, reconfiguring module 1158 may communicate with receiving module 1150, obtaining module 1152, sending module 1154, and determining module 1156.

Some embodiments of the disclosure may provide one or more technical advantages. As an example, particular embodiments reduce the problem of a possible misalignment between the wireless device and the network regarding the switch CFN if the downlink HARQ ACK does not reach the wireless device. In particular embodiments, the wireless device may retransmit the MCI using the HARQ buffer a maximum number of times.

Particular embodiments fine tune the number of times the MCI is retransmitted in the HARQ buffer, which provides real-time flexibility (e.g., different values in different networks and/or under different conditions). Particular embodiments are flexible and facilitate improved switching times in both good and bad radio environments. When the radio conditions are good, for example, the handshake is fast and a switch to the new configuration is performed quickly. When the radio conditions are not as good, multiple attempts are still faster than waiting until the backup activation time. The backup activation time may be set to a relatively large value for wireless devices in bad conditions.

Particular embodiments indicate to the wireless device a latest threshold time for a handshake attempt to avoid misalignment between the wireless device and the network regarding the proper time to switch to the new configuration. These embodiments are useful in bad radio conditions when the downlink RRC reconfiguration message may arrive after considerable delay. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ACK Acknowledgement
BTS Base Transceiver Station
CFN Connection Frame Number
D2D Device to Device
DCCH Dedicated Control Channel
eNB eNodeB
FDD Frequency Division Duplex
HARQ Hybrid Automatic Repeat Request
HS-DSCH High Speed Downlink Shared Channel
HS-SCCH High Speed Shared Control Channel
LTE Long Term Evolution
MAC Medium Access Layer
M2M Machine to Machine
MCI MAC Control Information
MCS Modulation and Coding Scheme
MIMO Multi-Input Multi-Output
MTC Machine Type Communication
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
SRB Signaling Radio Beater
TDD Time Division Duplex
UE User Equipment
UTRAN Universal Terrestrial Radio Access Network
WAN Wireless Access Network

The invention claimed is:

1. A method in a wireless device of reconfiguring radio resources in a wireless communication network, the method comprising:
   receiving a radio resource control (RRC) message from a network node, the RRC message comprising a time for radio resource reconfiguration;
   obtaining a maximum retransmission threshold value and an indication of a backup reconfiguration time, the backup reconfiguration time occurring after the time for radio resource reconfiguration;
   sending a first control information message to the network node;
   determining the wireless device has not received a hybrid automatic repeat request (HARQ) acknowledgment (ACK) from the network node in response to the first control information message;
   determining a number of control information message transmissions is less than the maximum retransmission threshold value;
   sending a second control information message to the network node;
   determining the wireless device has not received a HARQ ACK from the network node in response to the second control information message and that the time for radio resource reconfiguration has passed; and
   performing radio resource reconfiguration at the backup reconfiguration time.

2. The method of claim 1, wherein obtaining a maximum retransmission threshold value comprises receiving the maximum retransmission threshold value in the received RRC message.

3. The method of claim 1, wherein obtaining a maximum retransmission threshold value comprises the wireless device being preconfigured with the maximum retransmission threshold value.

4. The method of claim 1, wherein the RRC message comprises a RRC Reconfiguration message.

5. The method of claim 1, wherein the backup reconfiguration time comprises a connection frame number (CFN).

6. The method of claim 1, further comprising: obtaining a time threshold value; and determining a current time is not within the time threshold value of the backup reconfiguration time before sending the first control information message and before sending the second control information message.

7. A method in a network node of reconfiguring radio resources in a wireless communication network, the method comprising:
   obtaining a maximum retransmission threshold value and an indication of a backup reconfiguration time, the backup reconfiguration time occurring after a latest time for radio resource reconfiguration;
   sending a radio resource control (RRC) message to a wireless device, the RRC message comprising the maximum retransmission threshold and the time for radio resource reconfiguration;
   receiving a control information message from the wireless device;
   determining a number of received control information messages exceeds the maximum retransmission threshold value; and
   performing radio resource reconfiguration at the backup reconfiguration time after the time for radio resource reconfiguration has passed.

8. A wireless device capable of reconfiguring radio resources in a wireless communication network, the wireless device comprising a processor, a memory, and a power source, the processor operable to:
   receive a radio resource control (RRC) message from a network node, the RRC message comprising a time for radio resource reconfiguration;
   obtain a maximum retransmission threshold value and an indication of a backup reconfiguration time, the backup reconfiguration time occurring after the time for radio resource reconfiguration;
   send a first control information message to the network node;
   determine the wireless device has not received a hybrid automatic repeat request (HARQ) acknowledgment (ACK) from the network node in response to the first control information message;
   determine a number of control information message transmissions is less than the maximum retransmission threshold value;
   send a second control information message to the network node;
   determine the wireless device has not received a HARQ ACK from the network node in response to the second control information message and that the time for radio resource reconfiguration has passed; and
   perform radio resource reconfiguration at the backup reconfiguration time.

9. The wireless device of claim 8; wherein the processor is operable to obtain the maximum retransmission threshold from the received RRC message.

10. The wireless device of claim 8, wherein the processor is operable to obtain the maximum retransmission threshold from a preconfigured value.

11. The wireless device of claim 8, wherein the RRC message comprises a RRC Reconfiguration message.

12. The wireless device of claim 8; wherein the backup reconfiguration time comprises a connection frame number (CFN).

13. The wireless device of claim 8, the processor further operable to: obtain a time threshold value; and determine a current time is not within the time threshold value of the backup reconfiguration time before sending the first control information message and before sending the second control information message.

14. A network node capable of reconfiguring radio resources in a wireless communication network, the network node comprising a processor and a memory, the processor operable to:
   obtain a maximum retransmission threshold value and an indication of a backup reconfiguration time, the backup reconfiguration time occurring after a time for radio resource reconfiguration;
   send a radio resource control (RRC) message to a wireless device, the RRC message comprising the maximum retransmission threshold and the time for radio resource reconfiguration;
   receive a control information message from the wireless device;
   determine a number of received control information messages exceeds the maximum retransmission threshold value; and
   perform radio resource reconfiguration at the backup reconfiguration time after the time for radio resource reconfiguration has passed.

* * * * *